United States Patent
Ma et al.

(10) Patent No.: US 9,778,918 B2
(45) Date of Patent: Oct. 3, 2017

(54) NATIVE ACCESS PLAN SOURCE CODE GENERATION

(71) Applicant: SYBASE, INC., Dublin, CA (US)

(72) Inventors: Xiaobin Ma, Fremont, CA (US); Xun Cheng, Dublin, CA (US); Prabhas Kumar Samanta, Kolkata (IN)

(73) Assignee: SYBASE, INC., Dublin, CA (US)

( * ) Notice: Subject to any disclaimer, the term of this patent is extended or adjusted under 35 U.S.C. 154(b) by 3 days.

(21) Appl. No.: 14/841,715

(22) Filed: Sep. 1, 2015

(65) Prior Publication Data

US 2017/0060539 A1   Mar. 2, 2017

(51) Int. Cl.
G06F 9/44 (2006.01)
G06F 17/30 (2006.01)

(52) U.S. Cl.
CPC .......... G06F 8/30 (2013.01); G06F 17/30525 (2013.01); G06F 17/30864 (2013.01)

(58) Field of Classification Search
CPC ......... G06F 17/30477; G06F 17/30424; G06F 17/30433; G06F 17/30935; G06F 17/30979; Y10S 707/99931; Y10S 707/99932; Y10S 707/99933; Y10S 707/99934
See application file for complete search history.

(56) References Cited

U.S. PATENT DOCUMENTS

| | | | | |
|---|---|---|---|---|
| 7,849,073 | B2 * | 12/2010 | Young-Lai | G06F 17/30445 707/713 |
| 9,195,712 | B2 * | 11/2015 | Freedman | G06F 17/30436 |
| 2005/0097078 | A1 * | 5/2005 | Lohman | G06F 17/30979 |
| 2008/0147599 | A1 * | 6/2008 | Young-Lai | G06F 17/30445 |
| 2009/0100004 | A1 * | 4/2009 | Andrei | G06F 17/30424 |
| 2009/0259644 | A1 * | 10/2009 | Scheuermann | G06F 17/30463 |
| 2010/0198811 | A1 * | 8/2010 | Wiener | G06F 17/30474 707/718 |
| 2011/0119283 | A1 * | 5/2011 | Tarachandani | G06F 17/30477 707/756 |
| 2013/0262437 | A1 * | 10/2013 | Abhinkar | G06F 17/30477 707/718 |

(Continued)

OTHER PUBLICATIONS

Neumann, Thomas. "Efficiently compiling efficient query plans for modern hardware." Proceedings of the VLDB Endowment 4.9 (2011): 539-550. Retrieved on [May 23, 2017] Retrieved from the Internet: URL<http://dl.acm.org/citation.cfm?id=2002940>.*

(Continued)

*Primary Examiner* — Thuy Dao
*Assistant Examiner* — Cheneca Smith

(57) ABSTRACT

Various embodiments of systems and methods to generate native access plan source code are described herein. In one aspect, a database query is received. A query execution plan, including a parent operator and one or more descendent operators, corresponding to the database query is retrieved. Further, a check is made to determine whether the parent operator and the one or more descendent operators include at least one loop. When both the parent operator and the one or more descendent operators include at least one loop, consume points for the at least one loop are defined. The parent operator and the one or more descendent operators are merged based on consume point types to generate native access plan source code.

17 Claims, 9 Drawing Sheets

(56) References Cited

U.S. PATENT DOCUMENTS

2014/0280030 A1* 9/2014 Freedman ......... G06F 17/30436
707/718

OTHER PUBLICATIONS

Berg et al. "Fast data-locality profiling of native execution." ACM SIGMETRICS Performance Evaluation Review. vol. 33. No. 1. ACM, 2005. Retrieved on [May 23, 2017] Retrieved from the Internet:URL<http://dl.acm.org/citation.cfm?id=1064232>.*

* cited by examiner

```
for (LeftScanNextOfNLJ2)
  for (RightScanNextOfNLJ2)  } 410
    for (LeftScanNextOfNLJ3)
      for (RightScanNextOfNLJ3)  } 420
        { send2client() }  } 430
```

FIG. 4

NATIVE ACCESS PLAN SOURCE CODE GENERATION

FIELD

Embodiments generally relate to computer systems, and more particularly to methods and systems to generate native access plan source code.

BACKGROUND

Data in computing systems is often stored in databases. A database may include multiple tables and multiple associative structures. The associative structures are important to efficient operation and control of a database management system. The database management system is a control system that supports database features including, but not limited to, storing data on a memory medium, retrieving data from the memory medium and/or updating data on the memory medium.

A query is used to access or update data in the database. For example, database systems may translate the given query into an expression in arithmetic, and then evaluate the arithmetic expression to produce the query result. One of the ways to execute these arithmetic plans is an iterator model, sometimes also called Volcano-style processing. Every physical arithmetic operator conceptually may produce a tuple stream from its input, and may allow iterating over the tuple stream by repeatedly calling the next function of the operator.

As database grows, query performance may be determined by central processing unit (CPU) costs for processing the database query. An iterator style query processing technique may be flexible, but may show poor performance on modern CPUs (for example, poor CPU register usage, increases the possibility of instruction miss and prevents CPU from making deep CPU pipelining) due to lack of code locality and frequent instruction mispredictions. Further, the execution path may be long as there can be too many function calls when producing a single tuple for a complex query.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

FIG. 4 shows an exemplary native access plan source code corresponding to the query execution plan of FIG. 3, according to an embodiment.

DETAILED DESCRIPTION

Embodiments of techniques to generate native access plan source code for database queries are described herein. Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

In this document, various methods, processes and procedures are detailed. Although particular steps may be described in a certain sequence, such sequence is mainly for convenience and clarity. A particular step may be repeated more than once, may occur before or after other steps (even if those steps are otherwise described in another sequence), and may occur in parallel with other steps. A second step is required to follow a first step when the first step is completed before the second step is begun. Such a situation will be specifically pointed out when not clear from the context. A particular step may be omitted; a particular step is required only when its omission would materially impact another step.

In this document, the terms "and", "or" and "and/or" are used. Such terms are to be read as having the same meaning; that is, inclusively. For example, "A and B" may mean at least the following; "both A and B", "only A", "only B", "at least both A and B." As another example, "A or B" may mean at least the following: "only A", "only B", "both A and B", "at least both A and B." When an exclusive-or is intended, such will be specifically noted (e.g., "either A or B", "at most one of A and B").

In this document, various computer-implemented methods, processes and procedures are described. It is to be understood that the various actions (receiving, retrieving, determining, generating etc.) are performed by a hardware device, even if the action may be authorized, initiated or triggered by a user, or even if the hardware device is controlled by a computer program, software, firmware, and the like. Further, it is to be understood that the hardware device is operating on data, even if the data may represent concepts or real-world objects, thus the explicit labeling as "data" as such is omitted. For example, when the hardware device is described as "storing a document", it is to be understood that the hardware device is storing data that represents the document.

Figure 1:
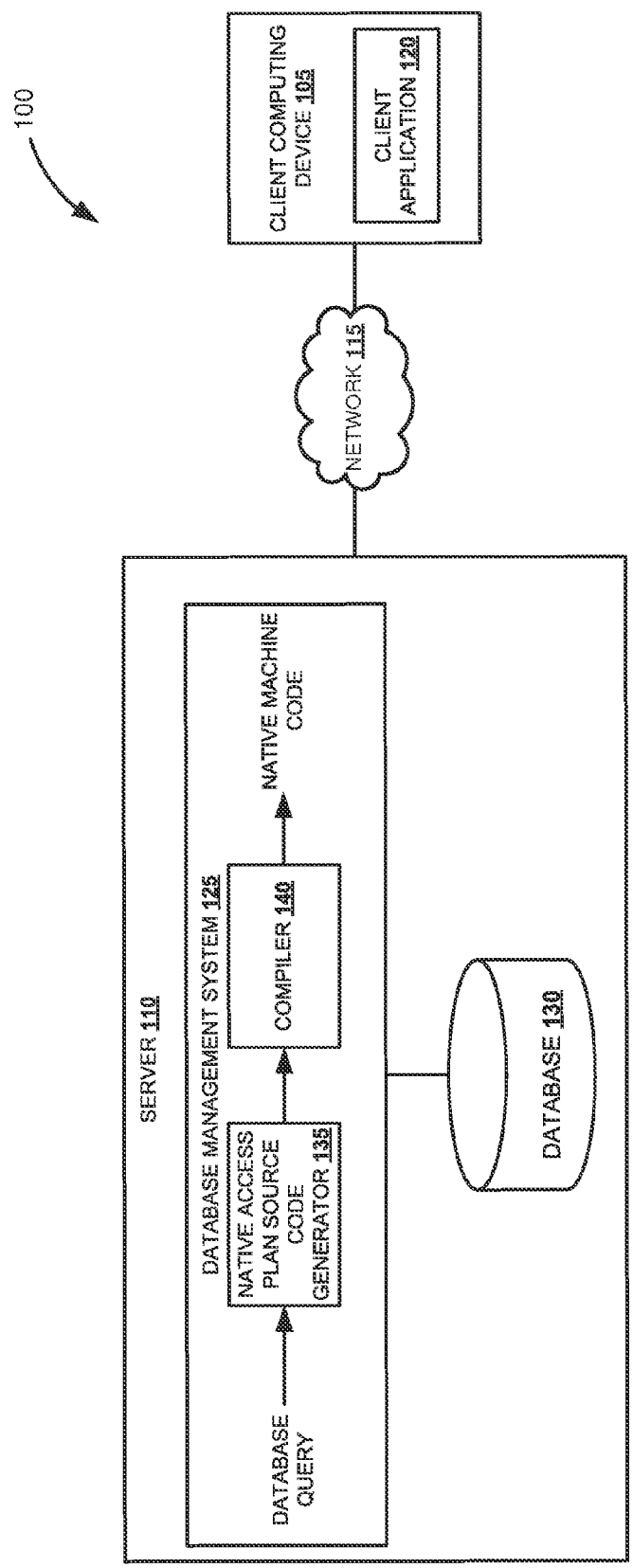
FIG. 1 is a block diagram illustrating a data processing environment according to an embodiment.

FIG. 1 is a block diagram illustrating data processing environment 100, according to an embodiment. FIG. 1 provides only an illustration of one implementation and does not imply any limitations with regard to the environments in which different embodiments may be implemented. The data processing environment 100 includes client computing device 105 and server 110 interconnected over network 115. The network 115 can be, for example, a local area network (LAN), a wide area network (WAN), such as the Internet, or a combination of the two, and can include wired, wireless, or fiber optic connections. Further, the network 115 can be any combination of connections and protocols that will support communications between the client computing device 105 and the server 110.

The client computing device 105 may be a desktop computer, a laptop computer, a tablet computer, a specialized computer server, a smart phone, or any programmable electronic device capable of communicating with the server 110 via the network 115 and with various components and devices within the data processing environment 100. Further, the client computing device 105 represents any programmable electronic device or combination of programmable electronic devices capable of executing machine-readable program instructions and communicating with other computing devices via a network, such as the network 115. The client computing device 105 includes client application 120.

The client application 120 can be any application or program that a user employs to submit a database query to the server 110. The database query is a request for data stored in tables in database management system 125. Queries allow the user to describe desired data, leaving the database management system 125 responsible for planning, optimizing, and performing the physical operations necessary to produce the result. Further, the database query may include a list of columns to be included in the final result. For example, the database queries are written in Structured Query Language (SQL), a special-purpose programming language designed for managing data held in database management system 125. The SQL consists of a data definition language and a data manipulation language. The scope of SQL includes, but not limited to data insert, query, update and delete, schema creation and modification, and data access control.

The server 110 may be a management server, a web server, or any other electronic device or computing system capable of receiving and sending data. In one exemplary embodiment, the server 110 represents a server computing system utilizing multiple computers as a server system, such as in a cloud computing environment. In another exemplary embodiment, the server 110 may be a laptop computer, tablet computer, netbook computer, personal computer (PC), a desktop computer, a personal digital assistant (PDA), a smart phone, or any programmable electronic device capable of communicating with the client computing device 105 via the network 115. In yet another exemplary embodiment, the server 110 represents a computing system utilizing clustered computers and components to act as a single pool of seamless resources. Further, the server 110 includes the database management system 125 and database 130.

The database management system 125 is a program or group of programs that work in conjunction with the operating system to create, process, store, retrieve, control, and manage data. The database management system 125 acts as an interface between the application program and the data stored in the database 130. The objective of the database management system 125 is to provide a convenient and effective method of defining, storing, and retrieving the information stored in the database 130. When the database management system 125 receives a database query, the database management system 125 converts the database query into an executable form or machine readable form or native machine code to perform operations corresponding to the database query. For example, the database query specifies the data that the user desires.

The database 130 is an organized collection of data. In one example, the database 130 may include multiple tables and multiple associative structures. A table is an object in the database including zero or more records and at least one field within a record. A record may be embodied as a row or a column in the table that is identified by a unique numeric called a record identifier. The database 130 stores the data that the database management system 125 accesses and manages.

In one embodiment, the database management system 125 includes native access plan source code generator 135 and compiler 140. When a user submits the database query, the native access plan source code generator 135 generates simpler intermediate code, referred as native access plan source code. Further, the subsequent execution of the database query will run the generated native access plan source code. In other words, the native access plan source code is converted to native machine code by the compiler 140. Since the complex database queries are converted to equivalent simpler native access plan source code, the performance of the database queries can be improved by speeding up the execution of the database queries. Further with the process, shorter code path, lesser branch statements and better instruction or data locality can be achieved.

Figure 2:
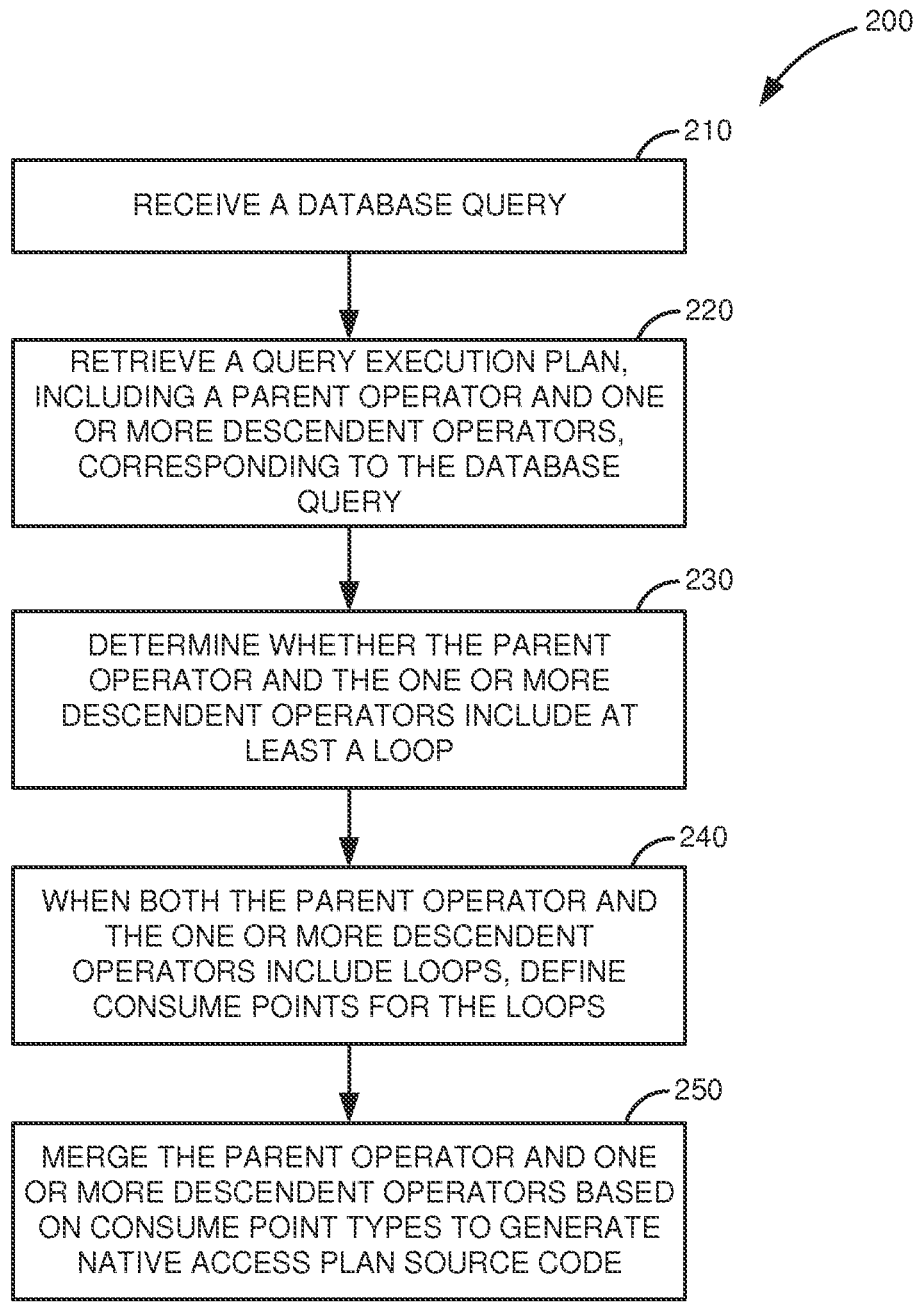
FIG. 2 is a flow diagram illustrating an example process to generate native access plan source code for database queries, according to an embodiment.

FIG. 2 is a flow diagram illustrating example process 200 to generate native access plan source code for database queries, according to an embodiment. At 210, a database query is received. For example, the process 200 to generate native access plan source code is described using database queries in Lava, SAP®'s implementation of the Volcano iterator model. Further, Low Level Virtual Machine (LLVM) compiler framework in a database management system is mentioned as an example to generate the native access plan source code. The LLVM include libraries to provide a source and target independent optimizer, along with code generation support, the API to generate LLVM IR code. The libraries are built around a well specified code representation known as the LLVM intermediate representation (LLVM IR). However, it is appreciated that the process 200 can be implemented to database queries written in different programming languages and any other server systems based on the Volcano iterator model, for instance. In the Volcano iterator model, operators are implemented as iterators that support open-next-close protocol. Basic operations of query execution are implemented as self-contained operators and query execution plans are trees built of operators. For example, the Adaptive Server® Enterprise (ASE) Lava execution engine of SAP®, implemented by using an object-oriented design, is based upon the Volcano iterator model.

At 220, a query execution plan corresponding to the database query is retrieved. The query execution plan is retrieved from a plan cache, for instance. The query execution plan includes at least a parent operator and one or more descendent operators corresponding to the database query. The query execution plan includes an access path for executing the database query and the functionalities of the operators (i.e., the parent operator and the one or more descendent operators). Examples of Lava operators are depicted in Table 1.

TABLE 1

| Operators | Functionality |
| --- | --- |
| Emit | Routes data to client |
| Scan | Scans tables, indices and partitions |
| CacheScan | Scans an in-memory cache |
| RemoteScan | Scans remote tables |
| Nested Loop Join (NLJ) | Implements theta joins and left semijoins |
| Scalar Aggregate | Performs scalar aggregation |
| Vector Aggregate | Performs grouping and aggregation |
| Insert | Inserts rows in a table |

Thereby, through the query execution plan the functionality or algorithmic property of the parent operator (e.g., "Emit") and the descendent operators (e.g., "Scan", "Nested Loop Join" (NLJ) and so on can be retrieved. The "Scan" operator does not contain the loop and the "Scan" operator reads one row for a call. The "NLJ" operator includes a double loop. Few operators may or may not contain a single loop and consume the generated rows. For example, "Scalar Aggregate" includes a loop and aggregates the generated rows. The "Insert" operator does not include the loop and inserts the generated rows. The generated rows, also referred as code, are resultant of execution of an operator.

At 230, a check is made to determine whether the parent operator and the descendent operators include at least a loop. In one exemplary embodiment, through the functionalities or properties of the operators as depicted in Table 1, a check is made to determine whether the operator includes a loop or not.

In one exemplary embodiment, when there is no loop in the operators of the query execution plan, a new loop on the parent or top operator (e.g., "Emit" operator) is created. In another exemplary embodiment, when the parent operator includes a loop and the descendent operators do not include any loop, the function of the descendent operator is called directly for execution.

In yet another exemplary embodiment, when both the parent operator and the one or more descendent operators include loops, consume points are defined for the loops for qualifying row of the query execution plan, at 240. A consume point is defined during native plan source code generation of an operator to identify a source code point inside the operator to which source code of another operator can be plugged in to form a compact source code. For example, a consume point is defined inside a join operator such as "NLJ" operator. When the "NLJ" operator is at right side of the parent "NLJ" operator, the consume point is defined as one type, "Type 1". When the "NLJ" operator is at left side of a parent "NLJ" operator, the consume point is defined as another type, "Type 2". In one exemplary embodiment, the query execution plan includes "n" number of consume points, where "n" is the number of the descendent operators including loops. Further, the type of the consume points depends on the property or functionality of the operator. For example, CP1 and CP2 are two types of consume points. Depending on whether the operator is a left child or a right child, the type of the consume points is defined, one consume point type for the left child and another consume point type for the right child. Further, when the parent operator does not include a loop and the descendent operators include a loop, a consume point (e.g., CP1) is defined for the loop.

At 250, the parent operator and the one or more descendent operators are merged based on consume point types to generate native access plan source code. The consume point types can be, but are not limited to, merge points and insert points. For example, the consume point of type CP2 can be a merge point that is located at the left side of the "NLJ" so the right child of the "NLJ" can be merged into the inner loop of left child to generate compact native access plan. Further, the consume point of type CP1 can be used as an insert point to insert consumer function such as "send2client" from the parent operator "Emit". Therefore, during native access source code generation of the parent operator, one operator is merged into another operator according to whether a child includes the consume point or not and the type of the consume point. Further, upon generating the native access plan source code, there will be one consume point and the other consume points will be eliminated.

In one exemplary embodiment, defining consume points includes defining corresponding consume point data structures. A consume point data structure is defined for the consume point to describe a consume pointer included in functions of the operators. The defined data structure may include a field "ConsumerPDType" to indicate the type of the consume point, for instance.

Further, defining corresponding consume point data structures includes generating an instance of a consume point data structure, mapping virtual address of an operator with a consume point in the instance of the consume point data structure, and storing the instance of the consume point data structure in a consume map data structure for future usage. For example, when a consume point is found during a Lava operator code generation at LLVM side, an instance of consume point data structure is generated and the mapping of the operator virtual address and the instance of the consume point data structure is stored in the consume map. Also, virtual address of the operator will be transferred back to the database, so the operator's parent is aware of the child operator associated with the consume point.

Therefore, in order to improve the performance the database queries, the described process introduces: a code generation phase to generate LLVM source code and a Just-In-Time (JIT) compilation phase to compile the generated LLVM source code, for instance, into the native access plan machine code. The subsequent executions will invoke the native access plan source code directly. JIT compilers are examples of a class of computer programs called code generators. Code generators take an input to generate a corresponding output of the native access plan machine code that can be directly run on a given type of processor. In one example, LLVM code generation framework is used to generate the LLVM Intermediate Representation (IR) code based on the Lava execution plan of the database query and then perform JIT compilation of the generated LLVM IR code to generate native machine code for the database query. Further, upon the IR code is completely built into native access plan machine code, the subsequent execution of the database query will run the native access plan source code. Thereby, the native access plan machine code is generated such that it has shorter code path, less branch statements, and better instruction or data locality. Also, by generating the intermediate code, the native access plan machine code speeds up the execution of database queries.

Figure 3:
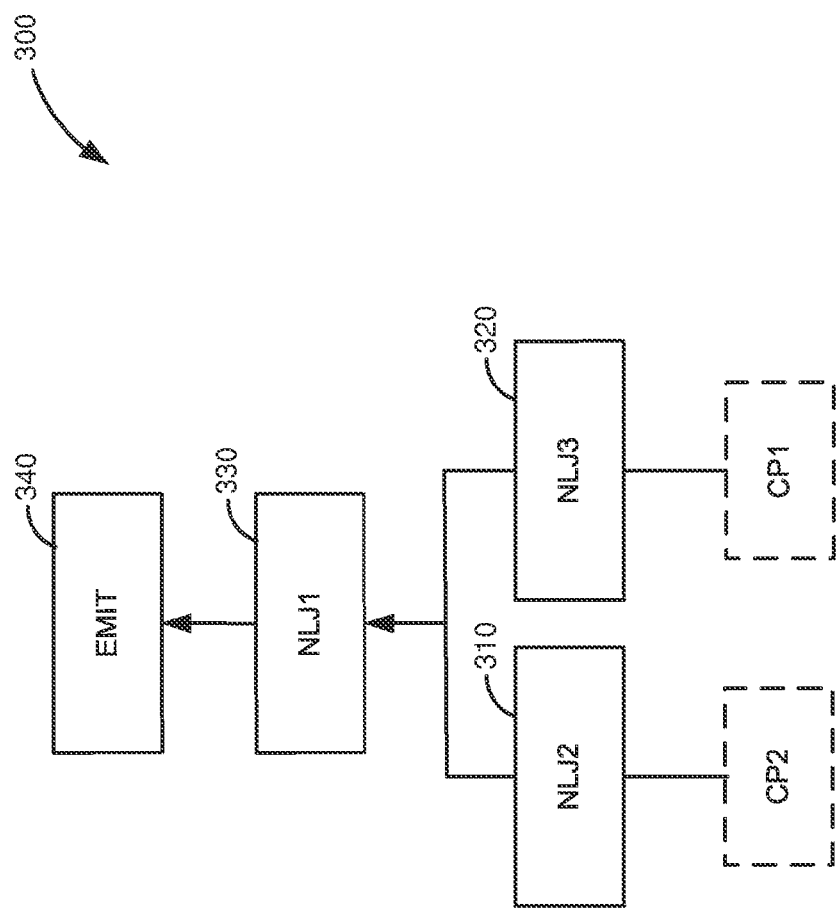
FIG. 3 is a block diagram illustrating an exemplary query execution plan for a database query, according to an embodiment.

FIG. 3 is a block diagram illustrating example query execution plan 300 for a database query, according to an embodiment. The query execution plan 300 is a Lava tree, for instance. In one embodiment, a native access plan source code generator generates intermediate native access plan source code by scanning the query execution plan in a bottom-up direction. Thereby, one scan of the query execution plan may be sufficient to generate the native access plan source code.

For example in the Lava tree of FIG. 3, the scan is made from a left leaf (or child) node (e.g., 310) to a right leaf (or child) node (e.g., 320). A left child operator "NLJ2" 310 is executed to generate code corresponding to the left child operator "NLJ2" 310 and then, a right child operator "NLJ3" 320 is scanned to generate code corresponding to the right child operator "NLJ3" 320. Further, two types of consume points are defined, one for the left child operator "NLJ2" 310 and one for the right child operator "NLJ3" 320 (e.g., CP2 and CP1, respectively) as depicted in FIG. 3. To consume the code corresponding to the left child operator "NLJ2" 310, the "NLJ2" 310 is called, where the consume point CP2 is defined. Further, to consume the code corresponding to the right child operator "NLJ3" 320, a consumer function "sendrow2client( )" of a parent operator (e.g., "Emit" operator 340) is executed, where the consume point CP1 is defined.

The consume point CP2 is a merge point, located at the left child of "NLJ1" 330 so the right child operator "NLJ3" 320 can be merged into an inner loop of the left child operator "NLJ2" 310 to generate compact native access plan source code. Further, the consume point CP1 can be used as an insert point to insert the consumer function such as "send2client" from the parent operator "Emit" 340. Merging two functions or operators can be defined as pushing generated code of an operator's function inside another operator's function. Thereby, the generated native access plan source code is compact and shows better code locality. Also, the compact native access plan source code does not have to exit from the child operator function in order to let parent operator consume the code corresponding to the child or descendent operators.

FIG. 4 shows an exemplary native access plan source code corresponding to the query execution plan of FIG. 3, according to an embodiment. Upon pushing code corresponding to "NLJ3" (e.g., 420) inside double loop of "NLJ2" (e.g., 410), referred as merge process, a parent operator "Emit" (e.g., 430) is pushed inside "NLJ3" (e.g., 420) to form the compact native access plan source code as shown in FIG. 4. In other words, the double loop of "NLJ3" (e.g., 420) is pushed inside or merged into the inner loop of "NLJ2" (e.g., 410), and the send2client( ) function (e.g., 430) generated for the "Emit" is pushed inside or inserted into the inner loop of NLJ3 (e.g., 420).

In FIG. 4, there is no virtual function call and all functionalities of the query execution plan of FIG. 3 are implemented with four "FOR" loops. Thus, there is no context switch due to function calls and the code becomes compact. Thereby, multiple generated functions of Lava operators are consolidated to form an efficient and compact native access plan source code. Further, the generated native access plan source code has structure and better code locality so that can increase instruction hit, CPU resource usage like register usage, and build deep code pipeline. Further, the process is performed within a single Lava tree traversal so minimizing the number of virtual function calls.

Figure 5:
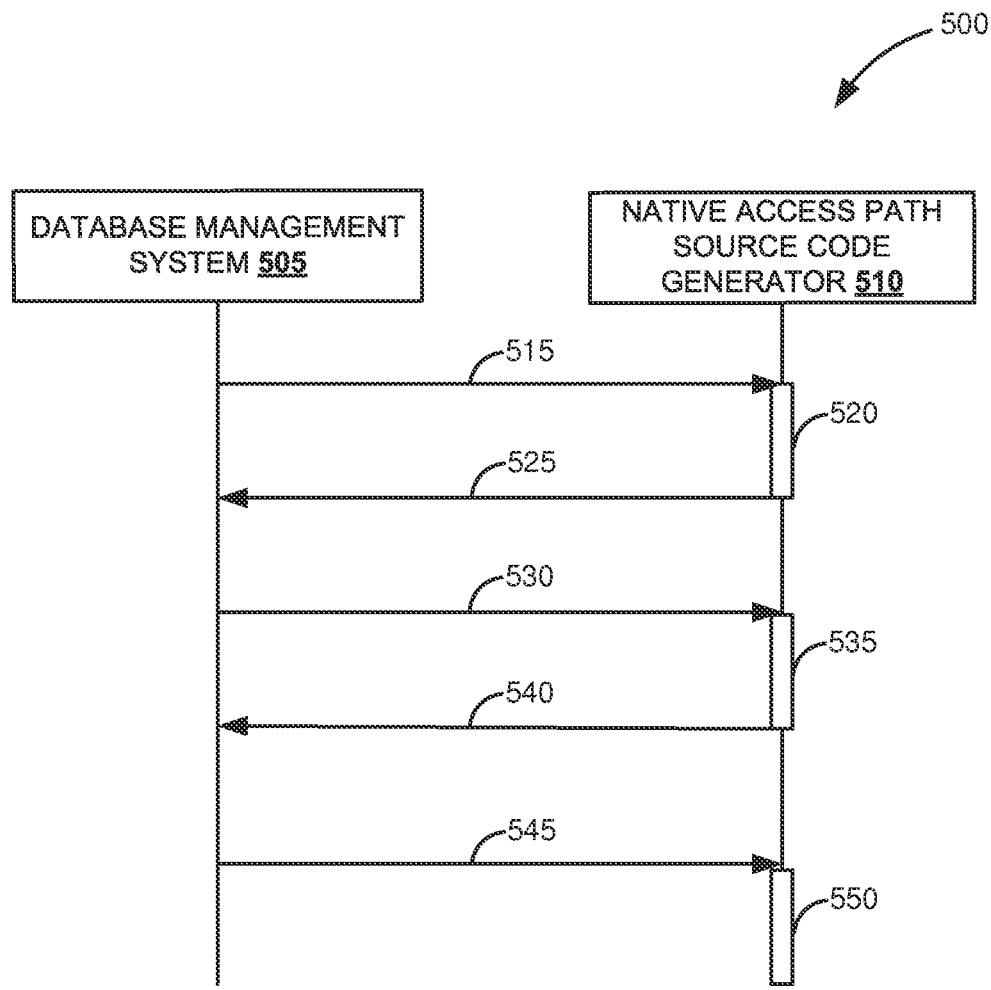
FIG. 5 is a sequence diagram illustrating an exemplary instruction flow between a database management system and a native access path source code generator, according to an embodiment.

FIG. 5 is a sequence diagram illustrating exemplary instruction flow 500 between database management system 505 and native access path source code generator 510, according to an embodiment. The sequence diagram represents the interactions and the operations involved between the database management system 505 and the native access path source code generator 510. The vertical lines of the database management system 505 and the native access path source code generator 510 represent the processes that may exist simultaneously. Activation boxes (e.g., 520, 535, and 550) between the horizontal arrows represent the processes performed in the native access path source code generator 510. An example for the database management system 505 can be, but not restricted to, an Adaptive Server® Enterprise (ASE) model of SAP®. An example of the native access path source code generator can be, but not restricted to, the Low Level Virtual Machine (LLVM) code generation module. In one embodiment, the instruction flow 500 illustrates interaction between the database management system 505 and the native access path source code generator 510 to generate, store, retrieve, and use consume points by generating native access plan source code for the access path depicted in FIG. 3.

At 515, a call is made to generate code corresponding to a left child "NLJ2" in an operator "NLJ1." Upon receiving the call, the code corresponding to the left child "NLJ2" is generated and a consume point of type CP2, for instance, is defined and stored in a consume map, at 520. Completion of the code generation is acknowledged at 525.

At 530, the call is made to generate code corresponding to a right child "NLJ3" in the operator "NLJ1." Upon receiving the call, the code corresponding to the right child "NLJ3" is generated and a consume point of type CP1, for instance, is defined and stored in the consume map, at 535. Completion of the code generation is acknowledged at 540.

At 545, the call is made to generate code corresponding to the operator "NLJ1", which is considered as a parent operator for the left child "NLJ2" and the right child "NLJ3." Upon receiving the call, the left child "NLJ2" is called and if there is consume point CP2 at the left child "NLJ2", the right child "NLJ3" is merged into the left child "NLJ2." Further, if there is consume point CP1 at the right child "NLJ3", a consume function "send2client( )" is pushed into an inner loop of the right child "NLJ3." Thereby, the consume point associated with the left child "NLJ2" (e.g., CP2) and the consume point associated with the right child "NLJ3" (e.g., CP1) are eliminated. Thereby, the functions of different Lava operators are consolidated to generated an efficient native access plan source code by defining the consume points during the native access plan source code generation.

In one exemplary embodiment, operators in the access path may include a single loop. For example, the operators "EmitSnd" and "ScalarAggregate" include a single loop. When there is no "NLJ" operator as a child node, a loop is generated for the operators having no loop and pushes their computation after a qualified row found by scanning the query execution plan. For example, the loop is generated on top of scan and push function send2client( ) after finding the qualified row. However, when there is a "NLJ" operator as the child operator, no loop is generated. Instead, the computation is pushed to the consume point. For example, the consume function "send2client( )" is pushed inside an inner loop of the "NLJ" so it can send a row to the client directly after finding a qualified row. For operator "ScalarAggrate", aggregate function is pushed (such as maximum, sum and so on) into the consume point, the inner loop of the "NLJ", so the operator "ScalarAggrate" can do aggregation after finding the qualified row.

In one exemplary embodiment, operators do not contain a loop. For example, operators such as "Restrict" and "DMLs" do not contain a loop. Thereby, the computation is pushed after finding a qualified row. Especially if the child operators are of "NLJ" type, the computation is pushed to the consume point.

Figure 6:
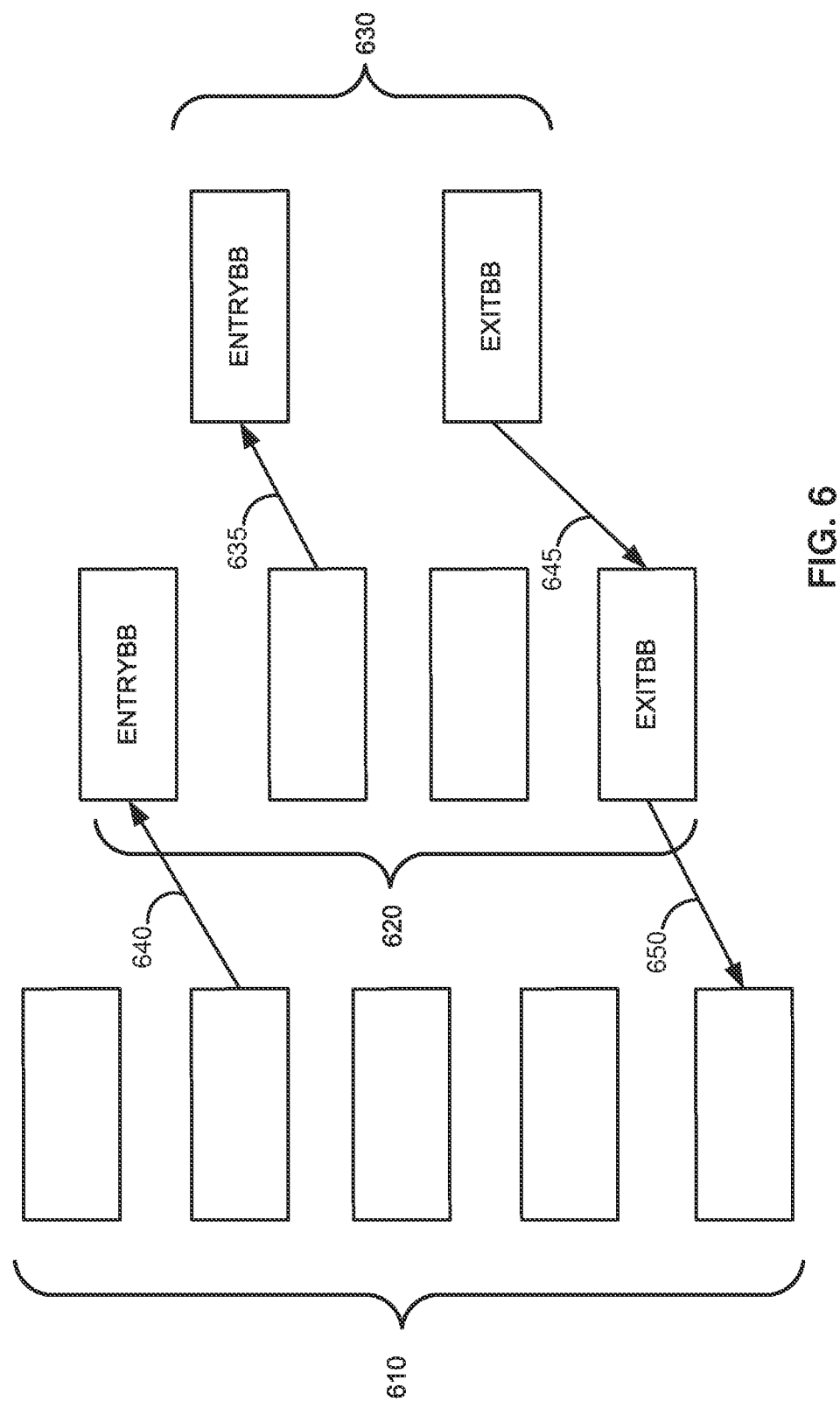
FIG. 6 is a block diagram illustrating exemplary implementation of function calls corresponding to a query execution plan of FIG. 3, according to an embodiment.

FIG. 6 is a block diagram illustrating exemplary implementation of function calls corresponding to a query execution plan of FIG. 3, according to an embodiment. In one example. Low Level Virtual Machine (LLVM) code generation framework is used to generate the native access plan source code. Further, blocks (e.g., funblocks or BasicBlocks "BB". 610, 620 and 630) are generated for LLVM functions as shown in FIG. 6. Generating LLVM BasicBlock (e.g., 610, 620 and 630) provides better performance as there is no extra overhead of calling LLVM functions, better instruction locality, and flexible coding.

In one exemplary embodiment, one function contains one or more LLVM BasicBlocks. BasicBlock "EntryBB" is the entry LLVM block of a function such as "scannext." When calling the function represented by the block, the calling function or block creates a LLVM branch instruction to jump to the "EntryBB" block. "ExitBB" is the exit block of the function. When exiting from the function, the calling function adds an LLVM branch instruction at the end of block ExitBB and jumps back to a calling function's block.

In one exemplary embodiment, the implementation of merge process described in FIG. 2 depends on system implementation. For example, when functions such as "NLJ2's" or "NLJ3's" is implemented as a function, merging "NLJ3" into "NLJ2" is to call "NLJ3" inside "NLJ2." When the instructions belonging to the function are generated on the LLVM blocks, merging NLJ3 into NLJ2 is to jump to "EntryBB" of implementation of "NLJ3" from a block of "NLJ2" (e.g., 635).

Implementation of how function call is called by jumping among LLVM BasicBlocks is shown in FIG. 6. For example, the blocks (e.g., 610) represent BasicBlocks of "NLJ1", the blocks (e.g., 620) represent BasicBlocks of "NLJ2", and the blocks (e.g., 630) represent BasicBlocks of "NLJ3" of FIG. 3. "NLJ1" calls "NLJ2" by jumping to entry block of "NLJ2" (e.g., 640). Further, inside "NLJ2", "NLJ3" is called by jumping to entry block of "NLJ3" (e.g., 635) and jumping back to "NLJ2" from exit block of "NLJ3" (e.g., 645). Further, jumping back to "NLJ1" from exit block of "NLJ2" (e.g., 650). Therefore, when multiple parent "NLJ" operators are added to FIG. 6, a very deep multi-level loop can be formed which exhibits great code locality.

Figure 7:
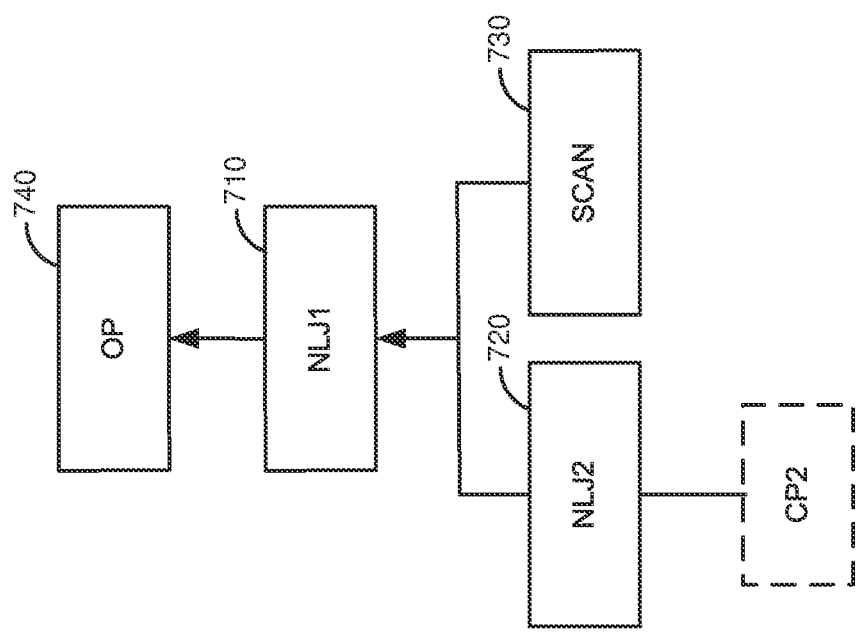
FIG. 7 shows an exemplary query execution plan for a database query, according to an embodiment.

FIG. 7 shows an exemplary query execution plan for a database query, according to an embodiment. In the following examples, it is assumed that source code of child operators is generated. In one example, "NLJ1's" 710 left child is a "NLJ2" 720 operator and right child is a "SCAN" 730 operator. Consume point in "NLJ2" 720 is CP2. Further, if "NLJ1" 710 is a left child of a parent operator (e.g., Op 740), the access plan means to keep CP2 and to merge "NLJ2" 720 into "NLJ1" 710 when generating code for "NLJ1" 710. On the other hand as an example of another case, if "NLJ1" 710 is a right child or a unique child, CP2 is converted to CP1 in "NLJ2" 720 and "NLJ2" 720 is merged into "NI 1" 710 when generating code for "NLJ1" 710. Thereby, merging the parent operator and the descendent operators includes converting the consume points (e.g., CP1 and CP2) to each other based on the relationship between the parent operator and the descendent operators.

Figure 8:
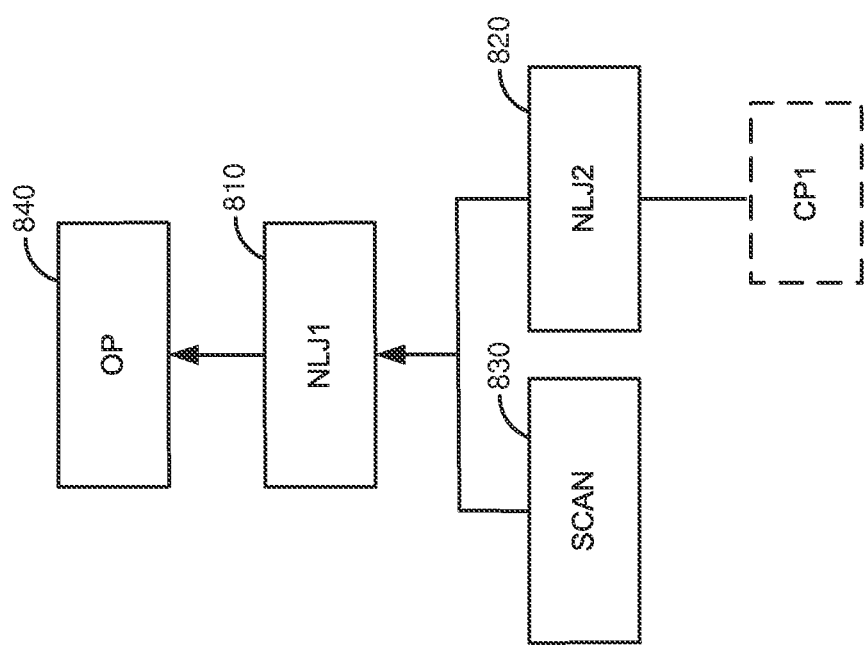
FIG. 8 shows an exemplary query execution plan for a database query, according to an embodiment.

FIG. 8 shows an exemplary query execution plan for a database query, according to an embodiment. In the following examples, it is assumed that code of child operators is generated. In one example, "NLJ1's" 810 right child is a "NLJ2" 820 operator and left child is a "SCAN" 830 operator. Further, a consumer point CP1 is defined for "NLJ2" 820. If "NLJ1" 810 is a left child of a parent operator (e.g., "Op" 840), the consume point CP1 in "NLJ2" 820 is converted to CP2, and "NLJ2" 820 is merged into "NLJ1" 810 when generating code for "NLJ1" 810. On the other hand, if "NLJ1" 810 is a right child of operator "Op" 840 or a unique child, the consume point CP1 is retained in "NLJ2" 820 and "NLJ2" 820 is merged into "NLJ1" 810 when generating code for "NLJ1" 810.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape: optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 9:
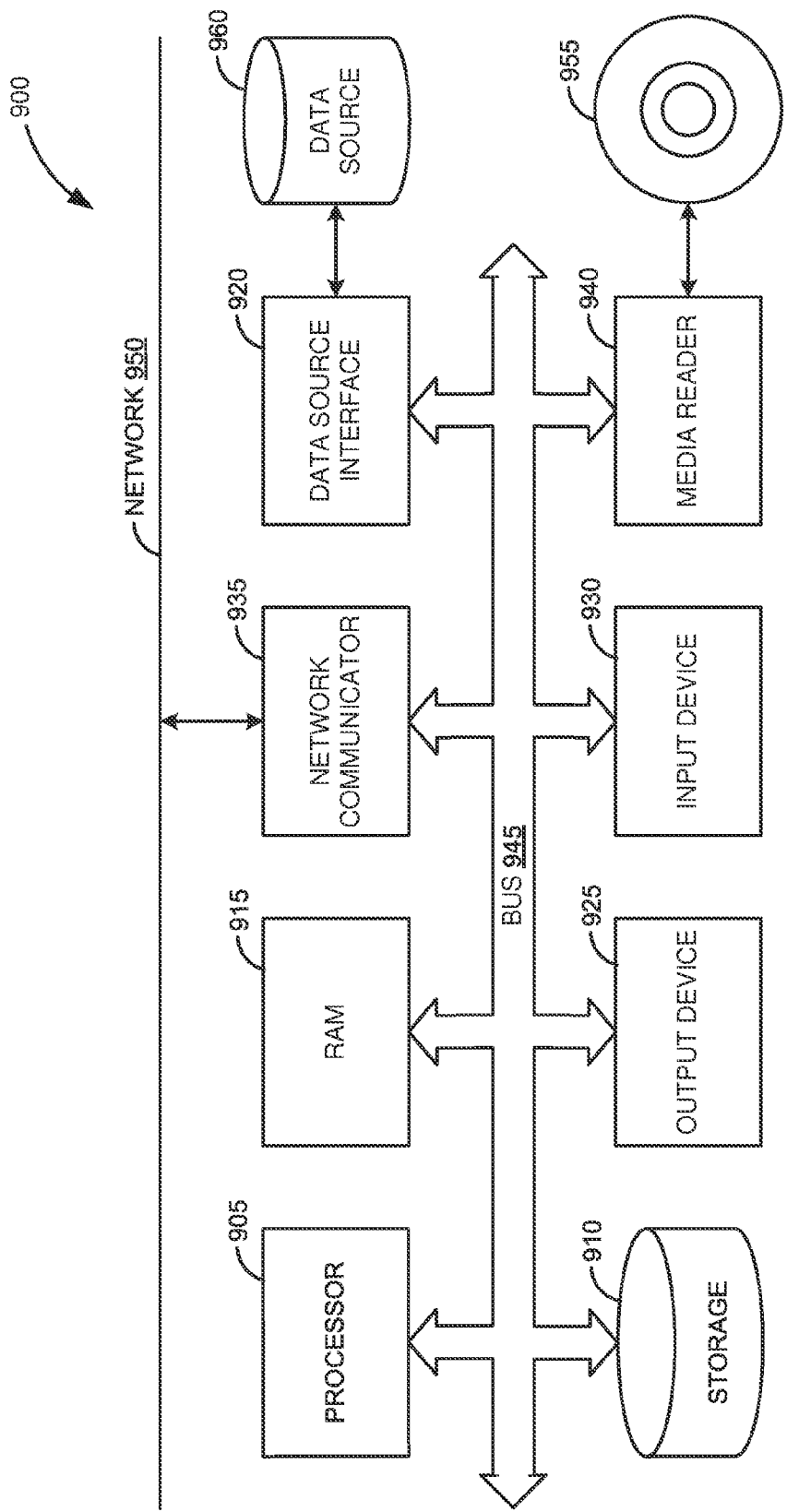
FIG. 9 is a block diagram of an exemplary computer system, according to an embodiment.

FIG. 9 is a block diagram of exemplary computer system 900, according to an embodiment. The computer system 900 includes a processor 905 that executes software instructions or code stored on a computer readable storage medium 955 to perform the above-illustrated methods. The processor 905 can include a plurality of cores. The computer system 9X) includes a media reader 940 to read the instructions from the computer readable storage medium 955 and store the instructions in storage 910 or in random access memory (RAM) 915. The storage 910 provides a large space for keeping static data where at least some instructions could be stored for later execution. According to some embodiments, such as some in-memory computing system embodiments, the RAM 915 can have sufficient storage capacity to store much of the data required for processing in the RAM 915 instead of in the storage 910. In some embodiments, all of the data required for processing may be stored in the RAM 915. The stored instructions may be further compiled to generate other representations of the instructions and dynamically stored in the RAM 915. The processor 905 reads instructions from the RAM 915 and performs actions as instructed. According to one embodiment, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. One or more of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A computer implemented method to generate native access plan source code, the method comprising:
   receiving a database query;
   retrieving a query execution plan, wherein the query execution plan comprises operators including a parent operator and one or more descendent operators, corresponding to the database query;
   determining whether the parent operator and the one or more descendent operators include at least one loop;
   when both the parent operator and the one or more descendent operators include loops, defining consume points for the loops, wherein the consume points identify a source code point inside an operator in the query execution plan to which source code of another operator in the query execution plan is plugged in to form compact source code; and
   generating the native access plan source code by merging the parent operator and the one or more descendent operators based on types of the consume points of the defined consume points, wherein merging the parent operator and the one or more descendent operators comprises converting the consume points based on a relationship between the parent operator and the one or more descendent operators.

2. The computer implemented method of claim 1, wherein the query execution plan comprises an access path for executing the database query and functionality of the parent operator and the one or more descendent operators.

3. The computer implemented method of claim 1, wherein when there is no loop in both the parent operator and the one or more descender operators of the query execution plan, creating a new loop on the parent operator.

4. The computer implemented method of claim 1, wherein when the parent operator comprises a loop and the one or more descendent operators do not include the loop, calling a function of the one or more descendent operators.

5. The computer implemented method of claim 1, wherein defining the consume points comprises defining corresponding consume point data structures.

6. A non-transitory computer-readable medium storing instructions, which when executed by a computer cause the computer to:
   receive a database query;
   retrieve a query execution plan, wherein the query execution plan comprises operators including a parent operator and one or more descendent operators, corresponding to the database query;

determine whether the parent operator and the one or more descendent operators include at least one loop;

when both the parent operator and the one or more descendent operators include loops, define consume points for the loops, wherein the consume points identify a source code point inside an operator in the query execution plan to which source code of another operator in the query execution plan is plugged in to form compact source code; and generate native access plan source code by merging the parent operator and the one or more descendent operators based on consume point types of the defined consume points, wherein merging the parent operator and the one or more descendent operators comprises converting the consume points based on a relationship between the parent operator and the one or more descendent operators.

7. The non-transitory computer-readable medium of claim 6, wherein the query execution plan comprises an access path for executing the database query and functionality of the parent operator and the one or more descendent operators.

8. The non-transitory computer-readable medium of claim 6, wherein when there is no loop in both the parent operator and the one or more descender operators of the query execution plan, create a new loop on the parent operator.

9. The non-transitory computer-readable medium of claim 6, wherein when the parent operator comprises a loop and the one or more descendent operators do not include the loop, call a function of the one or more descendent operators.

10. The non-transitory computer-readable medium of claim 6, wherein the types of the consume points depend on functionality of the one or more descendent operators.

11. The non-transitory computer-readable medium of claim 6, wherein the consume points comprise merge points and insert points.

12. The non-transitory computer-readable medium of claim 6, wherein defining the consume points comprises defining corresponding consume point data structures.

13. The non-transitory computer-readable medium of claim 12, wherein defining the corresponding consume point data structures comprises:

generate an instance of a consume point data structure;

map virtual address of an operator with a consume point in the instance of the consume point data structure; and store the instance of the consume point data structure in a consume map data structure.

14. A computing system to generate native access plan source code, comprising:

at least one processor; and one or more memory devices communicative with the at least one processor, wherein the one or more memory devices store instructions to:

receive a database query;

retrieve a query execution plan, wherein the query execution plan comprises operators including a parent operator and one or more descendent operators, corresponding to the database query;

determine whether the parent operator and the one or more descendent operators include at least one loop;

when both the parent operator and the one or more descendent operators include loops, define consume points for the loops, wherein the consume points identify a source code point inside an operator in the query execution plan to which source code of another operator in the query execution plan is plugged in to form compact source code; and generate native access plan source code by merging the parent operator and the one or more descendent operators based on types of the consume points of the defined consume points, wherein merging the parent operator and the one or more descendent operators comprises converting the consume points based on a relationship between the parent operator and the one or more descendent operators.

15. The computing system of claim 14, wherein the query execution plan comprises an access path for executing the database query and functionalities of the parent operator and the one or more descendent operators.

16. The computing system of claim 14, wherein when there is no loop in both the parent operator and the one or more descender operators of the query execution plan, create a new loop on the parent operator.

17. The computing system of claim 14, wherein when the parent operator comprises a loop and the one or more descendent operators do not include the loop, call a function of the one or more descendent operators.

* * * * *